(12) United States Patent
Kelly et al.

(10) Patent No.: US 11,995,510 B2
(45) Date of Patent: May 28, 2024

(54) OPTICAL AUTHENTICATION STRUCTURE WITH AUGMENTED REALITY FEATURE

(71) Applicant: Andrews & Wykeham Limited, Basingstoke (GB)

(72) Inventors: Dennis Allen Kelly, Basingstoke (GB); Max Zolotukhin, Basingstoke (GB)

(73) Assignee: ANDREWS & WYKEHAM LIMITED, Hampshire (GB)

( * ) Notice: Subject to any disclaimer, the term of this patent is extended or adjusted under 35 U.S.C. 154(b) by 0 days.

(21) Appl. No.: 17/891,369

(22) Filed: Aug. 19, 2022

(65) Prior Publication Data

US 2023/0056232 A1    Feb. 23, 2023

(30) Foreign Application Priority Data

Aug. 20, 2021 (GB) ................................... 2111974

(51) Int. Cl.
| | | |
|---|---|---|
| *G06K 7/14* | (2006.01) | |
| *G06T 11/00* | (2006.01) | |
| *G06V 20/20* | (2022.01) | |

(52) U.S. Cl.
CPC ............ *G06K 7/1417* (2013.01); *G06T 11/00* (2013.01); *G06V 20/20* (2022.01)

(58) Field of Classification Search
None
See application file for complete search history.

(56) References Cited

U.S. PATENT DOCUMENTS

| | | |
|---|---|---|
| 2008/0301464 A1 | 12/2008 | Parkinson |
| 2015/0116530 A1* | 4/2015 | Lau ...................... G07D 7/2008 348/222.1 |
| 2019/0012756 A1 | 1/2019 | Han et al. |
| 2019/0194484 A1 | 6/2019 | Villwock |

FOREIGN PATENT DOCUMENTS

| | | |
|---|---|---|
| DE | 2013110785 A1 | 4/2015 |
| WO | 2016018244 A1 | 2/2016 |
| WO | 2016053008 A1 | 4/2016 |
| WO | 2016157172 A2 | 10/2016 |
| WO | 2018049272 A1 | 3/2018 |
| WO | 2020239840 A1 | 12/2020 |
| WO | 2020239867 A1 | 12/2020 |

OTHER PUBLICATIONS

Search Report dated Feb. 2, 2022 for corresponding United Kingdom Application No. GB2111974.8.
Extended Search Report dated Jan. 23, 2023 in corresponding European Application No. 22191329.6.
Search Report dated Feb. 17, 2023 in corresponding UK Application No. GB2212138.8.

* cited by examiner

*Primary Examiner* — Kristy A Haupt
(74) *Attorney, Agent, or Firm* — MILES & STOCKBRIDGE P.C.

(57) ABSTRACT

Machine-executable instructions arranged to be executed by a processor of an authenticating apparatus, and the instructions configured to read a machine-readable security feature provided on or which is part of the optical authentication structure, and to thereby cause a display of the apparatus to show at least part of the optical authentication structure and augmented reality imagery, which augmented reality imagery at least in part allows the optical authentication structure to be authenticated.

19 Claims, 3 Drawing Sheets

OPTICAL AUTHENTICATION STRUCTURE WITH AUGMENTED REALITY FEATURE

PRIORITY

This application claims the benefit of United Kingdom Patent Application No. GB 2111974.8, filed on Aug. 20, 2021, in the United Kingdom Intellectual Property Office, which is incorporated herein by reference.

TECHNICAL FIELD

The present invention relates generally to security features of optical authentication structures.

BACKGROUND

Since the 1980's optical structures (which traditionally included holograms, microlens-based devices and lenticular devices, and more recently also interference structures, polarising structures, Fresnel arrays, Fresnel surfaces and surface plasmon polarition (SPP) devices) in the form of labels, laminates, overlays, foils, threads, inlays, tags or layers have been used for counterfeit protection and authentication of valuable items such as banknotes, documents and branded goods, as well as for brand enhancement. Authentication of such structures relies on features described as public-level (overt, features normally readily visible in normal light to the human eye); inspector-level (covert, usually requiring special detectors such as moiré raster decoders, hand-held microscopes, laser readers or similar) and forensic-level (requiring equipment found in specialised laboratories, such as high-magnification microscopes, spectrophotometers and the like). Increasingly such optical microstructures use various types of inspector-level machine-readable features authenticated with special detectors, document readers and, recently, smartphones. These may be either visible (e.g. an encrypted geometric pattern) or covert (e.g. chemical taggants automatically detected in certain part of the optical image).

We have devised an improved way of authenticating an optical authentication structure.

SUMMARY

According to one aspect of the invention there are provided machine-executable instructions arranged to be executed by a processor of an authenticating apparatus, and the instructions configured to read a machine-readable security feature provided on the optical authentication structure, and to cause a display of the apparatus to show at least part of the optical authentication structure and an augmented reality image, which augmented reality imagery at least in part allows the optical authentication structure to be authenticated.

The machine-readable security feature may be visible/discernible to the human eye.

The machine-executable instructions may be configured to generate the augmented reality imagery. The machine-executable instructions may include the characteristics of the augmented reality imagery to enable the same to be generated.

The machine-executable instructions may be configured to track the location of the machine-readable security feature in the field of view of a camera of the authenticating apparatus.

By 'augmented reality imagery' we include a visible image which is displayed in conjunction with an image of a real-world object, such that the augmented reality imagery appears to exist in the real-world when viewed on the display of the authenticating apparatus. Augmented reality imagery may more generally be said to be augmented reality content and may include animation, audio etc.

The machine-executable instructions may be seen as enabling the apparatus to interpret the camera input and use the same as a key for generating a pre-programmed/pre-determined augmented reality imagery (which may include a sequence of images on the display of the apparatus), in addition to displaying the live image of (at least part of) the optical authentication structure. The presence of the required augmented reality imagery on the display screen of the apparatus enables the authenticity of the optical authentication structure to be proved.

The machine-executable instructions may comprise instructions for comparing data captured from the machine-readable security feature, and determining (at least in part, or substantially fully) whether the optical authentication structure is genuine/authentic. In this regard, the machine-executable instructions may be arranged to compare data captured from the machine-readable security feature with data in a (locally or remotely stored) look-up table and/or to process the captured data and thereby determine if the optical authentication structure is genuine.

The machine-executable instructions may comprise a software product.

The augmented reality imagery may be arranged to be generated on a display screen of the authenticating apparatus in one or more predetermined locations or regions, relative to the viewed position in space of the optical authentication structure.

The augmented reality imagery may be maintained at a substantially static or fixed position relative to the viewed position of the displayed image of the optical authentication structure.

The displayed position of the augmented reality imagery may be caused to be dynamic relative to the displayed image of the optical authentication structure.

The generated augmented reality imagery may be arranged to be dynamic in relation to its displayed size, shape, outline and/or colour.

The generated augmented reality imagery may include one or more of the following: a static image, a dynamic image, multiple images displayed simultaneously and different images displayed sequentially and sets of images.

The augmented reality imagery may comprise a video.

The generated augmented reality imagery may comprise an alphanumeric sequence, an image of a person or object, a three-dimensional image, an animated image and/or a video sequence.

The generated augmented reality imagery may be accompanied by sound or audio.

The augmented reality imagery may be configured to 'interact' with the optical authentication structure by providing a likeness or a variation of a similar overtly visible image included in the optical authentication structure.

The augmented reality image may, in addition, or alternatively, be configured to interact with the optical authentication structure by providing a likeness or a variation of a covert image provided by the optical authentication structure.

The augmented reality image may be configured to interact with the optical authentication structure by providing a likeness or a variation of a forensic image provided by the optical microstructure.

The augmented reality image may in whole or in part replicate, be complementary to and/or be a variant of a reference image provided by/on the optical authentication structure.

The augmented reality imagery may be arranged to be one or more of: generated adjacent to the machine-readable security feature, overlapping the machine-readable security feature and substantially in register with the machine-readable feature security feature, as viewed on a display screen of the authenticating apparatus.

The augmented reality imagery may comprise one or more elements which enhance or complete the machine-readable security feature. For example, the machine-readable feature may comprise an image with parts/portions not present (and so on the physical optical authentication structure it is seen an incomplete image). If the optical authentication structure is authentic, the augmented reality image fills in or completes the missing parts/portions, at the required locations.

Additionally, the machine-readable feature may include covert or forensic features authenticated using specialist detectors (decoders, laser readers, microscopes etc.).

Where the optical authentication structure is configured to be used for protecting branded goods from counterfeit, the augmented reality imagery may be arranged to provide brand-related marketing information.

The augmented reality imagery may be predetermined (either singularly or as a selected one of predetermined set of images|). In this way a user is able to confirm authentication by the displayed augmented image corresponding to an expected image (such an image corresponding to a reference image provided on the optical authentication structure). Where a reference image is provided by said structure, this is normally distinct and separately located from the machine-readable security feature. Said reference image may not necessarily be in the field of view of the camera of the authenticating apparatus.

According to another aspect of the invention there is provided an authenticating apparatus which is loaded with the machine-executable instructions mentioned in the above aspect.

The apparatus may comprise a unitary device, which may include an electronic device such as a smartphone, smart glasses, tablet computer, laptop computer, or a dedicated terminal, and the unitary device includes a camera, a display screen (to show what is in the field of view of the camera), a data processor and a memory. The unitary device may be a personal electric device (PED), or more generally an electronic device.

The apparatus may however provide the functionalities of image reading/capture, image processing, display output as more than one physical entity/device, but wherein the different physical entities/devices provide different functionalities but are nevertheless operationally connected together.

According to another aspect of the invention there is provided an optical authentication structure which is provided with a machine-readable security feature, which feature is arranged to be captured by a camera of an authenticating apparatus so as to enable the authenticating apparatus to generate an augmented reality image to authenticate the optical authentication structure to a user.

The optical authentication structure may comprise at least one of a hologram, a rainbow (Benton) hologram, a photopolymer hologram, a surface plasmon polarition (SPP) device, an interference structure, a polarising structure, a Fresnel surface, a Fresnel array, a microlens-based device and a lenticular device. The optical authentication structure may comprise a holographic structure.

The machine-readable security feature may be visible to the human eye. By 'visible to the human eye', we include that the presence of the feature is apparent from a visual inspection.

The machine-readable security feature may be readable to the authenticating device by way of reflected and/or refracted light.

The machine-readable security feature may be integrated/incorporated with the optical authentication structure. The security feature may be part of the optical authentication structure. The optical authentication structure may comprise or be a part of an original master, master shim, tool, label, tag, foil, thread, laminate, overlay, inlay, surface or subsurface layer of a monolayer or multi-layer construction or such complete construction or other object. [which may be used for the purposes of protecting documents and products from counterfeit, tamper and fraudulent alteration or for the purposes of brand enhancement]. The AR image may be generated from the only machine-readable feature (code), which may be an integral part of the9code optical authentication structure. This feature (code) may not be variable/serial. The feature (code) may be originated as part of a main holographic master or as part of a secondary master incorporated into such main master.

The machine-readable security feature may be referred to as a code. The machine-feature may incorporate encoded data.

The machine-readable security feature may comprise one or more sets of geometric shapes (such as fiducial markers) which may be generated in the same origination process as the other features of the optical microstructure e.g. a holographic barcode. The feature may be a bar code, QR or Datamatrix code, an encrypted barcode, a proprietary code for the augmented-reality application or, advantageously, a proprietary code with additional anti-copy functionality—a scrambled high-resolution code.

The machine-readable security feature may comprise one or more fiducials or marks, which allow the apparatus to locate said feature in its field of view.

The machine-readable security feature may comprise covert or forensic features such as microtexts, nanotexts, nanographics, and or laser-readable images.

The machine-readable security feature may be capable of being read utilising a photographic camera built into a smartphone, tablet, smart glasses or similar device, activated through installed machine-executable instructions (software app).

The optical authentication structure may be arranged as being suitable for counterfeit protection, authentication or brand enhancement.

As a further enhancement, separate geometric shapes may be rendered in fixed-colour techniques (e.g. achromatic gratings, crayon colour gratings etc.), which the app equipped with a colorimeter of spectrophotometer functionality will be able to recognise either as a fiducial marker for generating the augmented reality image or the 'activation switch' for the main functionality of the app.

The optical authentication structure may be suitable for incorporation as part of a credential.

By optical authentication structure we include a structure. which comprises a foil, film, laminate, thread, label and/or tag, which may be used for the purposes of protecting documents and products from counterfeit, tamper and fraudulent alteration or for the purposes of brand enhancement. The optical authentication structure, may be termed in some contexts as an optical microstructure and/or an optically variable device, and/or an optical security structure.

According to a further aspect of the invention there is provided a system comprising the machine-executable instructions of the above aspect and the optical authentication structure of the above aspect.

According to a further aspect of the invention there is provided a method of authenticating an optical authentication structure.

The method may include the steps of: capturing information from the machine-readable feature of an optical authentication structure, and causing an augmented reality imagery to be generated, which imagery at least in part allows for the optical authentication structure to be authenticated.

The method may comprise the further step of comparing the augmented reality imagery to content shown by or obtainable from the optical authentication structure.

The method may comprise using the system of the above aspect.

Any of the above aspects of the invention may comprise one and/or more features as disclosed in the description or shown in the drawings, either individually or in combination.

BRIEF DESCRIPTION OF THE DRAWINGS

Various embodiments of the invention will now be described, by way of example only, with reference to the following drawings, in which.

DETAILED DESCRIPTION

Figure 1:
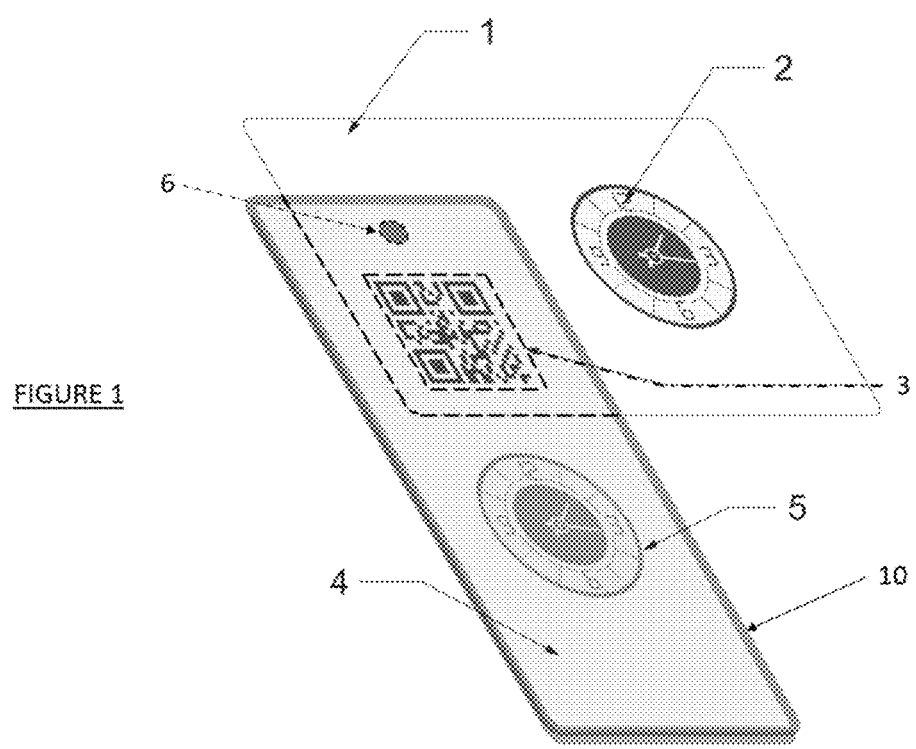
FIG. 1 is a schematic perspective view of a personal electronic device and an optical authentication structure to be authenticated, in which the optical authentication structure is provided with a first machine-readable security feature in the form of a two-dimensional barcode.

There are now described various embodiments of a system which includes a novel optical authentication structure and novel machine-executable instructions, which provide a way of verifying the authenticity of an optical authentication structure, such as foil or thread attached to a bank note, a passport or ID card laminate, ID card layer or label. In overview, in the embodiments described below, the optical authentication structure is provided with a machine-readable security feature. This security feature is configured to be read by an authenticating apparatus, which comprises a data processor, memory, a camera and a display screen. The authenticating apparatus has installed in a memory the machine-executable instructions (such as in the form of a software app) which are such that if the optical authentication structure is genuine, the camera of the apparatus will capture information encoded in the machine-readable security feature on the optical authentication structure and will in response show an augmented reality image (or images) on the display screen of the device together with showing at least a part of the optical authentication structure. This imagery provides visual authenticating information, which can be compared to reference imagery/information which is provided by or obtainable from, the optical authentication structure.

In the figures, like reference numerals denote the same or very similar features.

FIG. 1 shows the machine-readable security feature in the form of a QR code 3, which is an integral part of an optical authentication structure, which structure is validated by generating an augmented reality image, providing an augmented reality likeness of a visible reference image (in this case an image of a clock face) in the optical security structure, on the screen of a PED (such as a smartphone).

More specifically, the optical authentication structure 1 comprises a visible reference image 2 and a machine-readable security feature 3 in the form of a barcode, which are an integral part of the optical authentication structure. The PED has a software app installed. When the software app is used, it is capable of enabling authentication of the optical authentication structure (or otherwise, showing that the optical authentication structure is not genuine) by displaying (or otherwise) the augmented reality image. With the software app activated, the user directs the camera at the machine-readable feature so that it is within the field of view of the camera 6 of the PED. The display screen is caused to show the optical authentication structure, in whole or in part, as seen by the camera. The software app then identifies the machine-readable feature (i.e. the QR code in this case), and processes the data encoded within. If the data corresponds to validating data (either stored in a look-up table or generated through encryption), the software app determines that the optical authentication structure is genuine, and causes the PED to show an augmented reality image on the display screen. In this example, a user sees both all or part of the optical authentication structure as well as the augmented reality image. The user also sees the visible reference image 2 in the optical authentication structure, either within our outside the PED display. Thus, a user can easily determine that the optical authentication structure 1 is genuine as the result of the augmented reality image 3 corresponding to the reference image 2.

Figure 2:
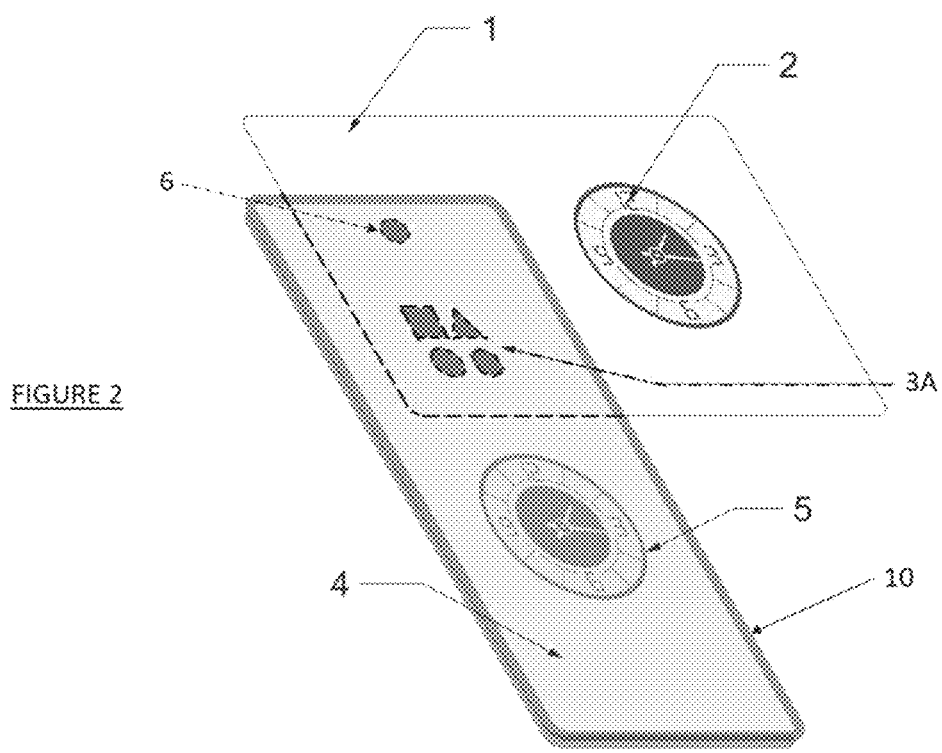
FIG. 2 is a schematic perspective view of a personal electronic device and an optical authentication structure to be authenticated in which the optical authentication structure is provided with a machine-readable security feature in the form of geometric shapes.

FIG. 2 shows a variant embodiment to that shown in FIG. 1 in which the machine-readable security feature 3A comprises a set of geometric shapes (fiducial marker), which is an integral part of the optical authentication structure, generating an augmented reality image, providing a likeness of a visible reference image in the optical authentication structure, on the screen of the device.

Figure 3:
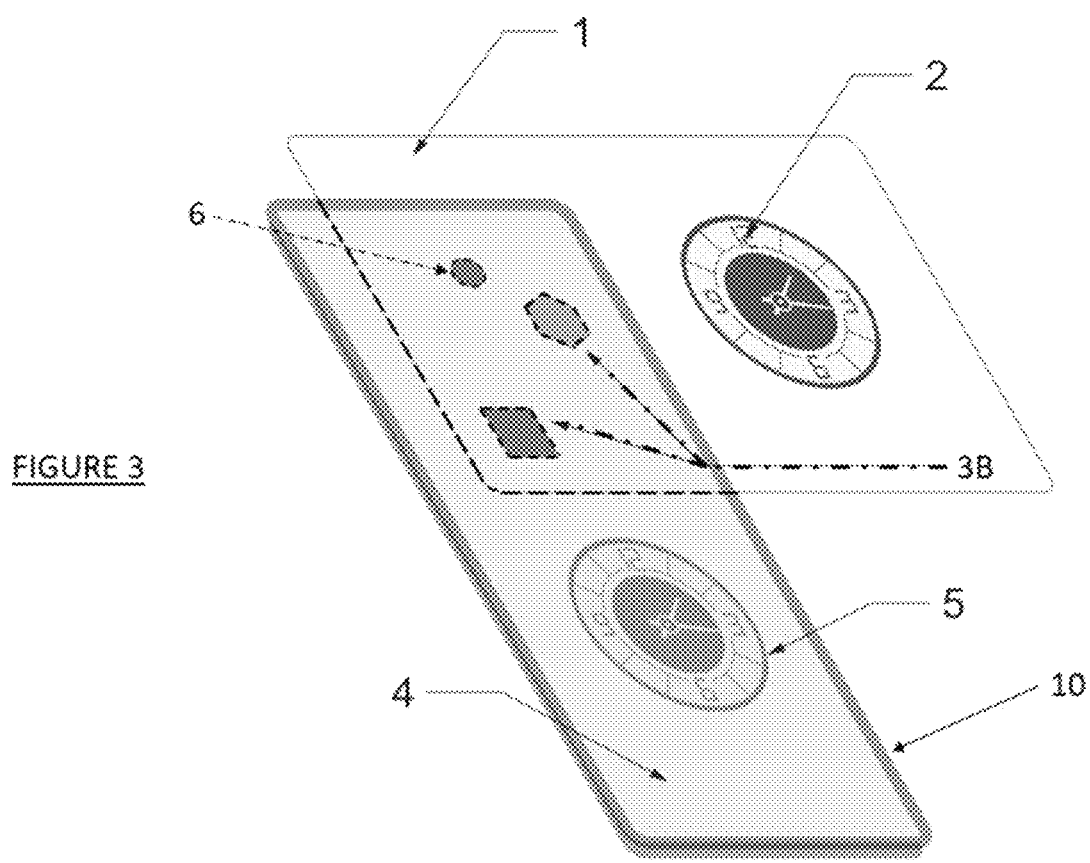
FIG. 3 is a schematic perspective view of a personal electronic device and an optical authentication structure to be authenticated in which the optical authentication structure is provided with a machine-readable security feature in the form of geometric shapes with fixed colour(s).

FIG. 3 shows yet a further variant embodiment in which the machine-readable augmented reality feature comprises two geometric shapes with fixed colour replay (fiducial markers), which are an integral part of the optical authentication structure, generating an augmented reality image, providing a likeness of a visible reference image in the optical authentication structure, on the screen of the device.

Although in the above examples, authentication is achieved by the user comparing the generated augmented reality imagery with the reference image; in other embodiments, the generated augmented reality imagery may not be connected to any images in the optical authentication structure but present independent content; in further embodiments the generated augmented reality imagery may be arranged to have correlation to the machine-readable feature (which brought about the generation of the AR imagery).

It will be appreciated that the reference image need not be visible, and may be a covert or forensic reference image.

The above-described embodiments advantageously provide a valuable additional tool for counterfeit protection, authentication and brand enhancement.

The invention claimed is:

1. Machine-executable instructions arranged to be executed by a processor of an authenticating apparatus, and the instructions configured to read a machine-readable security feature or which is an integral part of an optical authentication structure, and to thereby cause a display of the apparatus to show at least part of the optical authentication structure and augmented reality imagery, which augmented reality imagery at least in part allows the optical authentication structure to be authenticated.

2. The machine-executable instructions as claimed in claim 1 which include the characteristics of the augmented reality imagery to enable the same to be generated.

3. The machine-executable instructions as claimed in claim 1 which comprise instructions for comparing data captured from the machine-readable security feature, and determining (at least in part, or substantially fully) whether the optical authenticating structure is genuine/authentic.

4. The machine-executable instructions as claimed in claim 1 which are configured to cause the augmented reality imagery to be generated on a display screen of the authenticating apparatus in one or more predetermined locations or regions, relative to the viewed position in space of the optical authentication structure.

5. The machine-readable instructions as claimed in claim 1 in which the generated augmented reality imagery provides a likeness or a variation of a visible reference image provided by the optical authentication structure, which visible reference image is arranged to provide an authenticating reference for the generated augmented reality imagery.

6. The machine-readable instructions as claimed claim 1 in which the generated augmented reality imagery provides a likeness or a variation of a covert reference image present in the optical authentication structure, which covert reference image is arranged to provide an authenticating reference for the generated augmented reality imagery.

7. The machine-readable instructions as claimed in claim 1 in which the generated augmented reality imagery provides a likeness or a variation of a forensic reference image present in the optical authentication structure, which forensic reference image is arranged to provide an authenticating reference for the generated augmented reality image.

8. The machine-executable instructions as claimed in claim 1 in which the augmented reality imagery is arranged to be one or more of: generated adjacent to the machine-readable feature, overlapping the machine-readable feature and substantially in register with the machine-readable feature, as viewed on a display of the authenticating device.

9. The machine-executable instructions of claim 1, in which the augmented reality imagery includes one or more of the following: a static image, a dynamic image, multiple images displayed simultaneously and different images displayed sequentially.

10. The machine-executable instructions of claim 1, in which the augmented reality imagery includes one or more of the following: an alphanumeric sequence, an image of a person or object, a three-dimensional image, an animated image and a video sequence.

11. The optical authentication structure as claimed in claim 10 in which the machine-readable security feature comprises one or more of; a shape, a set of shapes, a barcode, a holographic barcode, a QR code, an encrypted barcode, a Datamatrix code, an anti-copy code and a proprietary code.

12. The optical authentication structure as claimed in claim 10 which includes a visible image, which is arranged to provide an authenticating reference for the generated augmented reality image.

13. The optical authentication structure as claimed in claim 10 which includes a covert image, which is arranged to provide an authenticating reference for the generated augmented reality image.

14. The optical authentication structure as claimed in claim 10 which includes a forensic image, which is arranged to provide an authenticating reference for the generated augmented reality image.

15. An optical authentication structure which is provided with a machine-readable security feature which is an integral part of the optical authentication structure and which may be originated as part of a master of the optical authentication structure or comprising a separately originated optical authentication structure element included in the main optical authentication structure in a secondary process, which machine-readable security feature is arranged to be read by a camera of an authenticating apparatus so as to enable the authenticating apparatus to generate an augmented reality image on its display to at least in part enable authentication of the optical authentication structure to a user.

16. An optical authentication structure as claimed in claim 15 which comprises or is part of any of an original master, master shim, tool, label, tag, foil, thread, laminate, overlay, inlay, surface or subsurface layer of a monolayer or multilayer construction or such complete construction or other object.

17. The optical authentication structure as claimed in claim 15 which comprises at least one of a hologram, a rainbow (Benton) hologram, a photopolymer hologram, a surface plasmon polarition (SPP) device, an interference structure, a polarising structure, a Fresnel surface, a Fresnel array, a microlens-based device and a lenticular device.

18. A method of authenticating an optical authentication structure comprising the steps of: capturing information from a machine-readable security feature which is an integral part of the optical authentication structure, and thereby causing an augmented reality imagery to be generated by an authenticating apparatus which displays at least part of the optical authentication structure and augmented reality imagery, which imagery at least in part allows for the optical authentication structure to be authenticated.

19. A method as claimed in claim 18 which comprises the step of comparing the augmented reality imagery to content shown by or obtainable from the optical authentication structure.

* * * * *